United States Patent
Veligdan et al.

(10) Patent No.: US 7,062,134 B2
(45) Date of Patent: Jun. 13, 2006

(54) INTERACTIVE DISPLAY SYSTEM HAVING A SCALED VIRTUAL TARGET ZONE

(75) Inventors: James T. Veligdan, Manorville, NY (US); Leonard DeSanto, Dunkirk, MD (US)

(73) Assignee: Brookhaven Science Associates, Upton, NY (US)

( * ) Notice: Subject to any disclaimer, the term of this patent is extended or adjusted under 35 U.S.C. 154(b) by 117 days.

(21) Appl. No.: 10/651,190

(22) Filed: Aug. 28, 2003

(65) Prior Publication Data
US 2005/0047738 A1 Mar. 3, 2005

(51) Int. Cl.
*G02B 6/04* (2006.01)
*H04N 5/66* (2006.01)

(52) U.S. Cl. .................. 385/120; 385/129; 345/158; 348/164; 348/804

(58) Field of Classification Search .............. 385/116, 385/120, 121, 129, 901; 348/164, 197, 771, 348/804
See application file for complete search history.

(56) References Cited

U.S. PATENT DOCUMENTS

| 5,381,502 | A | | 1/1995 | Veligdan |
| 5,455,882 | A | | 10/1995 | Veligdan |
| 5,577,148 | A | * | 11/1996 | Kamatani ................. 385/115 |
| 5,926,168 | A | * | 7/1999 | Fan ......................... 345/158 |
| 6,175,679 | B1 | | 1/2001 | Veligdan et al. |
| 6,222,971 | B1 | | 4/2001 | Veligdan et al. |
| 6,301,417 | B1 | | 10/2001 | Biscardi et al. |
| 6,400,876 | B1 | | 6/2002 | Biscardi et al. |
| 6,519,400 | B1 | | 2/2003 | Biscardi et al. |
| 6,535,674 | B1 | | 3/2003 | Veligdan |

* cited by examiner

*Primary Examiner*—Sung Pak
*Assistant Examiner*—Omar Rojas
(74) *Attorney, Agent, or Firm*—Reed Smith LLP; William J. McNichol, Jr.; Mathew J. Esserman

(57) ABSTRACT

A display system includes a waveguide optical panel having an inlet face and an opposite outlet face. A projector and imaging device cooperate with the panel for projecting a video image thereon. An optical detector bridges at least a portion of the waveguides for detecting a location on the outlet face within a target zone of an inbound light spot. A controller is operatively coupled to the imaging device and detector for displaying a cursor on the outlet face corresponding with the detected location of the spot within the target zone.

44 Claims, 2 Drawing Sheets

INTERACTIVE DISPLAY SYSTEM HAVING A SCALED VIRTUAL TARGET ZONE

STATEMENT REGARDING FEDERALLY SPONSORED RESEARCH OR DEVELOPMENT

This invention was made with Government support under Contract No. DE-AC02-98CH10886 awarded by the Department of Energy. The Government has certain rights in this invention.

BACKGROUND OF THE INVENTION

The present invention relates generally to optical waveguides, and, more specifically, to optical panels formed therefrom.

U.S. Pat. No. 5,381,502 discloses a polyplanar optical display (POD) including ribbon optical waveguides laminated together. Image light is projected through an inlet face of the display for total internal reflection therein, with a video image being displayed at an opposite outlet face end of the panel.

U.S. Pat. No. 5,455,882 discloses another form of a POD panel configured for interactive operation. The video image is projected outbound through the stacked waveguides, and an interactive light beam may be directed inbound through the outlet face toward the inlet face for detection of its screen position for providing interactive capability.

In both patents, the similarly configured optical panels permit light transmission in either direction from the inlet face to the opposite outlet face, or from the outlet face to the opposite inlet face. This capability permits the use of the optical panels in various applications for providing high definition viewing screens for televisions, computer monitors, and various other types of viewing screens as desired.

Typically, detection of the inbound light for interactive capability may be effected using a conventional linear array of photodiodes. The array is sized in length to bridge the entire stack of waveguides for detecting inbound light in each waveguide for determining the corresponding position thereof. However, the cost of the array increases with the required total length thereof, and correspondingly increases the associated cost of the optical display which is a significant factor in competitive marketing thereof.

Furthermore, another advantage of the POD panels is their relative light weight notwithstanding the relatively large sizes in which they may be made. A panel having a diagonal measure of one to two meters, for example, has a correspondingly large viewing screen over which a correspondingly large area of interactive capability may be effected. Detecting inbound light for interactive capability typically requires correspondingly long arrays of photodiodes for effectively covering the entire viewing screen.

Accordingly, it is desired to provide a display system having interactive capability with corresponding advantages in implementation.

BRIEF SUMMARY OF THE INVENTION

A display system of the present invention includes a waveguide optical panel having an inlet face and an opposite outlet face. A projector and imaging device cooperate with the panel for projecting an image through the panel for display on the outlet face. An optical detector bridges at least a portion of the waveguides for detecting a location on the outlet face within a target zone of an inbound light spot. A controller is operatively coupled to the imaging device and the detector for displaying an indicator (e.g. cursor) on the outlet face corresponding with the detected location of the spot within the target zone.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE PREFERRED EMBODIMENTS

Figure 1:
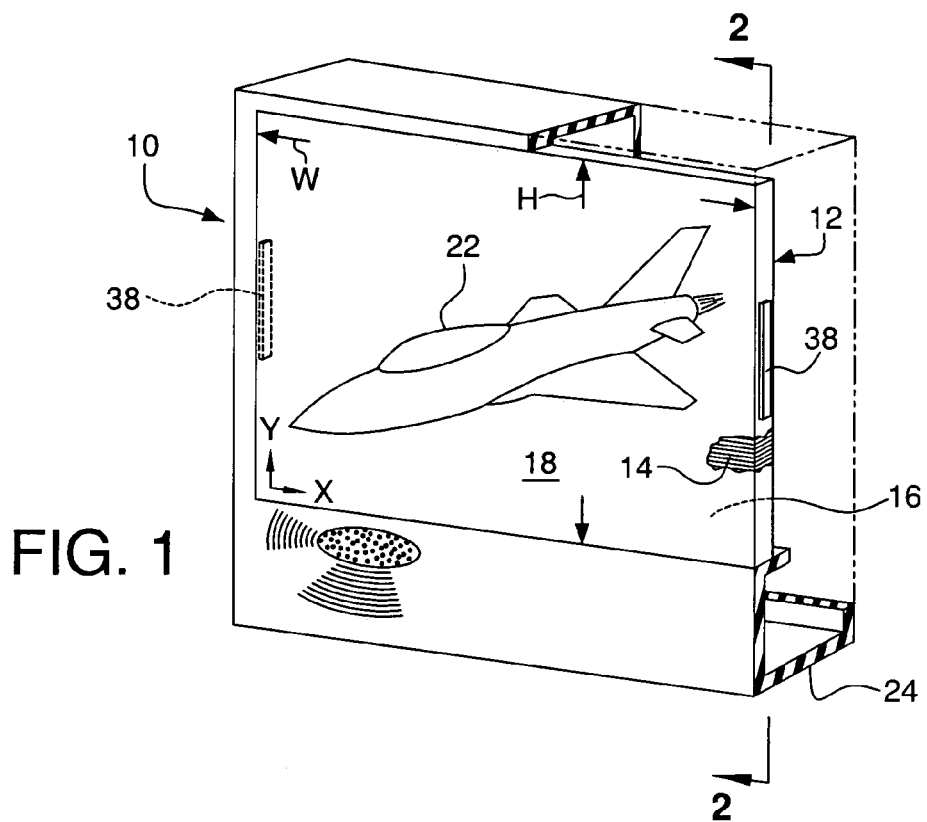
FIG. 1 is a partly sectional, front isometric view of an interactive display system in accordance with an exemplary embodiment of the present invention.

Illustrated in FIG. 1 is an interactive display system 10 in accordance with an exemplary embodiment of the present invention. The display system 10 is an assembly of components including an optical display panel 12 which includes a plurality of ribbon optical waveguides 14 which extend the full lateral or horizontal width W of the panel 12, and are stacked together vertically or transversely to define the full height H of the panel 12.

Figure 2:
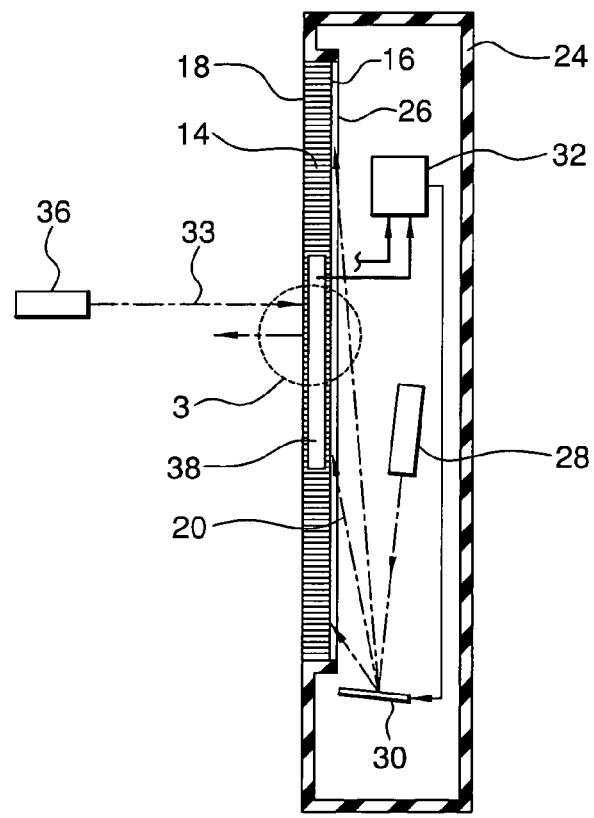
FIG. 2 is a partly sectional, side elevational view of the display system illustrated in FIG. 1 and taken along line 2—2 in FIG. 1.

The optical panel 12 may have any conventional form with the waveguides being arranged in various manners such as the wedge of decreasing size shown in U.S. Pat. No. 5,381,502, issued to Veligdan. As shown in FIG. 2, the waveguides 14 preferably have substantially identical size and are stacked vertically together in a column having first or back ends thereof collectively defining a planar inlet face 16, and opposite second or front ends thereof collectively defining a planar viewing outlet face 18.

Figure 3:
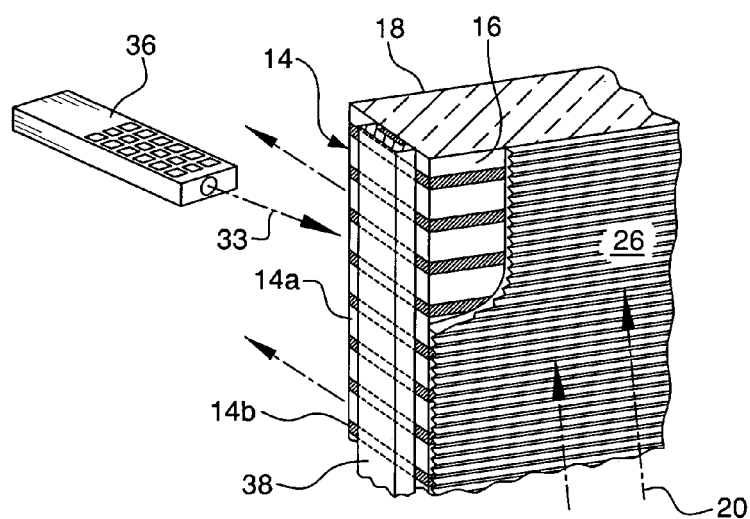
FIG. 3 is a partly sectional, enlarged view of a portion of the back of the optical panel illustrated in FIG. 2 and taken within the dashed circle labeled 3 in FIG. 2.

As shown in more detail in FIG. 3, each waveguide 14 includes an optically transparent core 14a disposed between cladding layers 14b. Due to the difference of index of refraction between the core 14a and cladding 14b, an image light beam 20 may be channeled through the individual waveguides 14 with total internal reflection in a conventional manner. As shown in FIG. 2, the image beam 20 is projected on the inlet face 16 for display on the outlet face 18 as an image (or video image) 22 illustrated in FIG. 1.

As shown in FIG. 3, the cladding 14b is preferably a dark color (e.g. black) for enhancing the contrast of the image as seen by an observer or user interacting with the display system 10.

As initially shown in FIGS. 1 and 2, the various components of the display system 10 may be mounted in a suitable housing 24 which is preferably relatively thin for minimizing the space requirements for the display 10. Since the inlet face 16 extends the full width and height of the panel 12, it is desirable to additionally provide a light coupler 26 over the inlet face 16 for redirecting the incident image light 20 to minimize the depth requirement of the housing 24.

In a preferred embodiment, the coupler 26 comprises Fresnel prismatic microscopic grooves which are straight along the full width of the panel 12 and spaced vertically apart along the height of the panel 12. A preferred form of the coupler 26 is a Transmissive Right Angle Film (TRAF) commercially available from the 3M Company of St. Paul, Minneapolis, under the trade name TRAF II. This TRAF film permits the image light 20 to be projected at a small acute angle over the back of the optical panel 12, and then redirected up to about 90 degrees for channeling through the waveguides 14 for display from the outlet face 18. Other types of couplers of the types mentioned in U.S. Pat. No. 6,301,417, issued to Biscardi et al, may be alternatively employed. Alternatively, the coupler 26 may be eliminated, and the image beam may be aimed directly at the inlet face in typical rear-projection fashion.

The optical panel 12 may have any suitable configuration utilizing a plurality of stacked optical waveguides in which light may be transmitted in either direction between the inlet face and outlet face sides thereof. As shown schematically in FIGS. 2 and 4, the optical panel 12 is mounted in the housing 24 for cooperating with a suitable light projector 28 having any conventional configuration for projecting the light used in forming any desired video image 22. The light exiting the projector 28 is preferably in the form of a beam, rather than diffuse light.

For example, the projector 28 may include a lamp for producing white light which is projected through suitable projection lenses for use in creating any desired video image 22 on the outlet face 18. Color may be added to the light beam by, for example, rotating a conventional color wheel in a known manner inside or outside the projector 28.

The projector 28 preferably cooperates with a digital imaging device 30 for digitally creating the desired video image. Any suitable digital imaging device can be used, but a Digital Micromirror Device (DMD) imaging device 30 is preferred. The DMD 30 is an imaging device optically aligned between the projector 28 and the inlet face 16 which selectively reflects the image beam 20 through a cooperating projection lens (not shown) to form the video image. The imaging device 30 is a small semiconductor light switch including an array of, for example, thousands of microscopically sized image mirrors (not shown) each mounted on a hinge for being individually tilted back and forth, typically with an angular range of plus or minus 10 degrees when activated. When inactive, the individual micromirrors assume an intermediate relaxed position. The DMD 30 is a conventional device commercially available from Texas Instruments Inc. of Dallas, Tex. for use in digital light processing in creating digital images for various applications.

Figure 4:
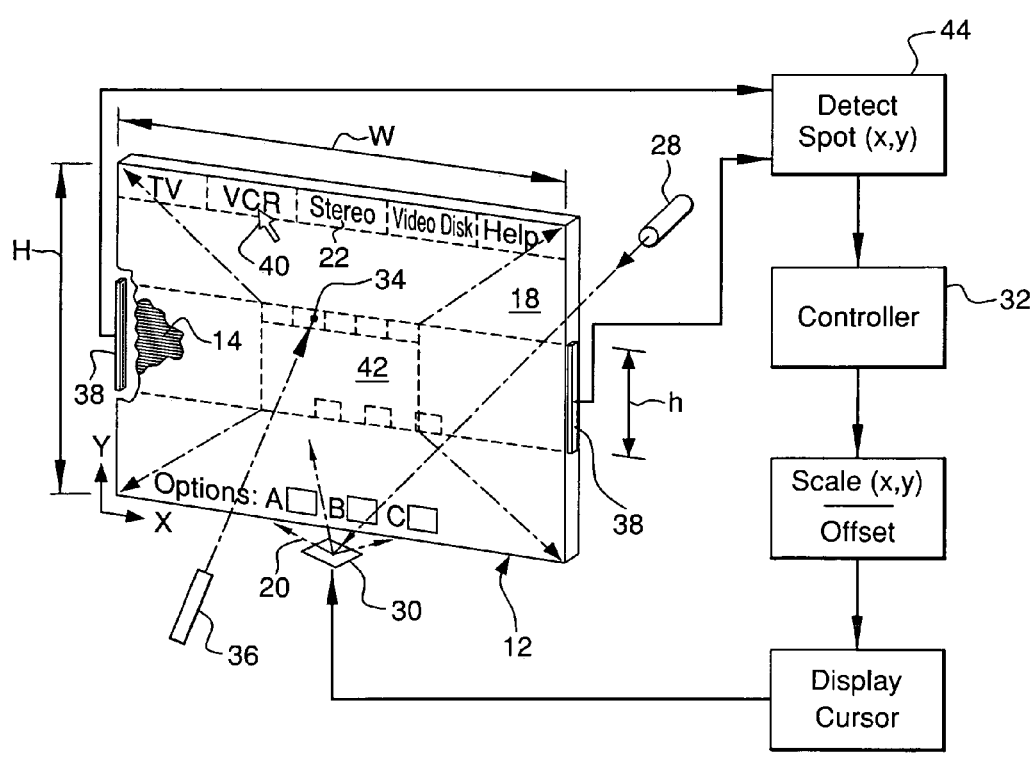
FIG. 4 is a front isometric view of the display system illustrated in FIGS. 1–3 in conjunction with a flowchart representation of its control elements in accordance with an exemplary embodiment of the present invention.

The DMD imaging device 30 is illustrated schematically in FIG. 4 in cooperation with an exemplary conventional electrical controller 32 which is used to independently control each of the thousands of micromirrors therein. The imaging device 30 is operatively coupled to the controller 32 through a suitable electronic driver (not shown) for controlling operation thereof and the form of the video image 22 displayed on the panel 12.

The controller 32 may take any conventional configuration such as a digital microprocessor programmed with suitable software for displaying any desired video image for any suitable purpose. The controller 32 may be used for displaying ordinary television video images from the panel 12, or other video images typically displayed on computer monitors, automated teller machines (ATM), etc. And, the controller 32 may be operatively coupled to the various components of the display system 10 using conventional electrical interfaces and drivers as required.

For purposes of this disclosure, the term "outbound" is defined as the direction from the inlet face 16 towards the outlet face 18, and the term "inbound" is defined as the direction from the outlet face 18 towards the inlet face 16.

FIG. 4 illustrates the basic operation of the display system of the present invention in which the controller 32 suitably operates the associated electronic driver for positioning the various micromirrors in the imaging device 30 for creating any desired video image 22 projected on the outlet face 18. The imaging device 30 spatially and temporally modulates the light beam emitted from the projector 28 for creating the image beam 20 which is preferably suitably imaged through projection optics (not shown) and redirected through the light coupler 26 for transmission outbound through the optical panel for display on the outlet face 18.

Since the optical panel 12 permits light transmission either outbound therethrough or inbound therethrough, the same panel may be used for both displaying any desired video image and providing interactive capability to a user. The exemplary video image illustrated in FIG. 4 is a menu of suitable choices which may be selected by the user for any desired application. For example, the optical panel may be part of a projection TV, computer monitor, or ATM machine which receives instructions from the intended user. Instead of providing a separate and dedicated keyboard for interacting with the system, the optical panel 12 itself may be used in accordance with the present invention.

In response to the image beam generated menu illustrated in FIG. 4, an inbound probe light beam 33 in the form of a light spot 34 is suitably formed on the panel at a selected lateral position X along the width of the outlet face 18 and transverse position Y along the height of the outlet face for identifying the desired menu choice.

In a preferred embodiment, a battery powered, remote optical pointer 36 is configured for emitting the probe light beam 33 which is simply aimed and pointed toward the outlet face to define a visible or invisible light spot positionable at any location over the entire outlet face. For example, the pointer may include a light emitting diode (LED) for emitting an infrared (1R) laser light beam invisible to the user.

A suitable light detector 38 may then be used to vertically bridge the waveguides 14 for detecting the lateral and transverse location (X,Y) on the outlet face of the light spot 34.

Optionally, the inbound (e.g. IR) probe beam may be modulated to enhance the ability of the detector to discriminate the inbound probe beam from background or extraneous light normally entering the outlet face 18 during operation or found in the panel 12 from the image beam 20 itself. Alternatively, temporal and/or spatial uncoupling of the inbound probe beam from the outbound image beam (which may, for example, comprise both visible and IR light) may instead (or additionally) be employed for discrimination purposes.

Since the light spot 34 is preferably invisible IR light, interactive feedback to the user is desired. Accordingly, the controller 32 is operatively coupled with both the imaging device 30 and the detector 38 for providing conspicuous and visible interactive feedback to the user. The controller is preferably configured in suitable software for driving the imaging device 30 to display an indicator (e.g. a visible cursor 40) on the outlet face corresponding with the detected location of the spot. The cursor 40 is a corresponding portion of the video image 22 being displayed, and may have any suitable form such as a small arrow for indicating position within the outlet face.

Since the spot 34 is preferably invisible, the controller determines the location thereof on the screen using the light detector 38 and then drives the imaging device 30 to produce the visible cursor 40 corresponding with the position of the spot on the outlet face. That correspondence or mapping of the cursor 40 to the spot 34 may have various forms including identical or coincident mapping to the location of the spot wherever the spot may be moved over the screen, or may be non-coincident therewith.

In the preferred embodiment illustrated in FIG. 4 the controller 32 is configured for driving the imaging device to display on the outlet face the cursor 40 offset in location from the detected location of the spot. This operation has particular utility for relatively large outlet faces which may be interactively controlled using a relatively small portion thereof located wherever as desired.

This advantage is similar to that provided in a typical personal computer which may be controlled by using a conventional mouse to move a cursor over the viewing screen. Movement of the mouse in a small area atop a desk may be translated by the computer software into larger coverage over the entire viewing screen.

The bidirectional light transmission capability of the optical panel illustrated in FIG. 4 permits various embodiments for interactive control thereof. The waveguides 14 preferably extend laterally across the full width of the screen, and are laminated or stacked together vertically or transversely along the full height of the screen and define opposite front and back faces through which light may be transmitted.

The light detector 38 may therefore bridge the waveguides along the height of the panel to define on the outlet face an invisible virtual target or zone 42, inside which target the lateral and transverse location of the spot 34 can be detected by the detector 38. Since the waveguides 14 are continuous, the detector may be located at any convenient location along the panel, either along the front, back, or edges thereof. And, the outlet face 18 is preferably suitably configured (e.g. by an integral diffuser or by an additional diffusing element) for diffusing both the outbound beam forming the viewing image, and the inbound probe beam for being scattered inside the waveguides to reach the detector. The diffusing configuration is particularly useful when the detector is edge-mounted.

The target 42 may have any suitable configuration as defined by the length of the light detector 38, and the controller 32 is configured for driving the imaging device to display the cursor 40 at a location suitably corresponding to the location of the detected spot inside the target. In this way, a functional correspondence between any portion of the entire outlet face 18 may be created with any suitable configuration of the target 42 so that spot location in the target is transformed to cursor location on the outlet face providing visible interactive feedback to the user.

Although the target 42 may be the same overall size as the outlet face, since the outlet face 18 may be considerably large, the detector 38 preferably bridges only some, but not all, of the waveguides 14 to limit the size of the detector and reduce cost, which correspondingly limits the size of the target 42 defined by the detector to a correspondingly small portion of the entire outlet face. For example, length h of the detector 38 illustrated in FIG. 4 may be about one third the height H of the entire outlet face, for example. Accordingly, the probe spot is undetectable in the remaining two thirds of the screen height not within the field of view of the detector.

Correspondingly, the controller 32 is preferably configured for driving the imaging device to display the cursor 40 outside the limited target 42, as well as inside therein as desired, in response to detecting the spot inside the target. In this way, the user may aim the pointer 36 within the target zone 42 and cause the cursor 40 to move over the entire outlet face as the spot is moved within the target, and provide interactive capability at any desired portion of the entire outlet face.

The configuration and size of the target 42 may be chosen as desired for particular interactive capabilities of the specific panel and specific application therefor. In a simple configuration, the target 42 may be scaled in direct proportion smaller than the entire outlet face, and correspondingly, the controller 32 is configured to position the cursor 40 scaled up in location from the location of the spot.

In this way, the location of the spot 34 in the limited zone of the target 42 may be mapped or transformed to the larger area of the entire outlet face 18 so that the relative placement of the spot 34 within the entire target corresponds with the relative placement of the cursor 40 within the entire outlet face. Then as the user aims and moves the pointer 36, the cursor moves in the same direction as the movement of the spot as produced by the pointer. The user may thusly aim the pointer at different locations on the outlet face, and in particular within the target 42, and the cursor 40 will correspondingly follow movement of the spot 34 over the entire extent of the outlet face as desired.

The light detector 38 illustrated in FIG. 4 may have any suitable configuration and is preferably in the form of a linear photodiode array disposed along one or both of the laterally opposite vertical edges of the panel, and traversing the corresponding waveguides within the height of the target 42. A monolithic, self-scanning photodiode array having 1,024 diodes therein is commercially available from Hamamatsu Corporation of Japan.

This form of detector has a width of about 2 mm and a length of about 20 mm and may be used in end-to-end groups for covering the desired height h of the target zone. One or more of the individual photodiodes may be aligned with corresponding ones of the waveguides for detecting light therein.

In this way, vertical or transverse position (Y) of the spot 34 may be readily determined by the corresponding vertical location of the specific diode detecting the correspondingly high intensity of the spot in the waveguide. Since the waveguides are continuous across the full width of the panel, the light spot may enter an individual waveguide at any lateral location while still being detected by the corresponding photodiodes at the edges of the panel.

In one embodiment, the light detector 38 may be mounted at either the left or right edge of the panel illustrated in FIG. 4, and preferably bridges the middle third of the screen, with the top and bottom thirds of the screen being without light detection capability. The corresponding target 42 extends in height corresponding with the height h of the detector array 38 in which the vertical position (Y) is readily determined by the specific photodiodes detecting maximum local intensity.

Although detecting vertical location (Y) alone of the spot 34 may be acceptable in some applications, detection also of the lateral or horizontal location (X) thereof is also desired for providing two-dimensional interactive capability over the entire target. It may be possible to calibrate a single-side array of the photodiodes so that relative light intensity detection thereof may be used to determine the lateral location (X) of the spot.

However, in the preferred embodiment illustrated in FIG. 4, a pair of the light detectors 38 are preferred and bridge the middle of the panel along both opposite left and right edges thereof. In this way, corresponding photodiodes on the left and right edges of the panel may be used to detect the relative intensity of the spot 34 and determine its lateral position (X) therefrom.

More specifically, the two detector arrays 38 may be operatively coupled to a conventional electrical comparator 44 which compares the relative intensity of the spot 34 for corresponding photodiodes in the left and right detectors to determine the lateral position of the spot inside the target. If the spot 34 is near the horizontal middle of the outlet face, the two detectors 38 will detect substantially equal intensity indicating the location of the spot at the mid-width of the outlet face.

And, as the spot 34 is moved closer to the left detector 38, the detected intensity thereof will be greater in the left detector than the right detector, and vice versa as the spot 34 is moved to the right. In this way, both the lateral (X) and transverse (Y) location of the spot 34 may be provided to the controller 32 suitably coupled to the comparator 44 for accurately positioning the cursor 40 in direct response to the location of the detected spot 34.

Although the virtual target 42 illustrated in FIG. 4 may extend across the full width of the outlet face within the ability of the two detectors 38 to accurately detect the lateral position of the spot, the target 42 may be horizontally truncated as desired. For example, the controller 32 may be configured to recognize only locations of the spot 34 solely within a horizontally truncated target 42 for providing a limited target in which the user may control movement and location of the cursor 40. And, the controller 32 may also be configured to offset the location of the cursor 40 both laterally in the horizontal X direction and transversely in the vertical Y direction from the detected location of the spot inside the target.

In this way, the target 42 may be configured to match the configuration of the entire outlet face 18 in a directly scaled-down version. Since the exemplary panel illustrated in FIG. 4 is rectangular, the target 42 may be a similar rectangle with the same height to width ratio as the panel, and be located in the center of the screen so that the user may accurately aim the pointer 36 without recognition of the existence of the smaller-sized virtual target 42 as distinguished from the entire outlet face.

Since the user is typically located at a suitable distance from the outlet face and aims the pointer toward the outlet face, the difference in aim between the limited zone provided by the target 42 and the entire outlet face will most likely be imperceptible to the user due to the very small cone angle from the pointer to the outlet face associated with the perimeter of the screen. Small changes in aim of the pointer may then correspond with large movement of the cursor 40 for reaching any part of the entire screen. Adjustments in the relative speed of the movement of the cursor as compared to the movement of the spot may be controlled by the controller 32 through suitable software programming.

As indicated above, the controller 32 may be configured in any suitable manner for displaying a video image 22 in the form of a suitable menu for providing interactive capability. The exemplary menu illustrated in FIG. 4 has various categories including the various options in each of those categories. The user simply aims the pointer 36 generally toward the outlet face and specifically toward the target 42 and moves the cursor 40 anywhere on the outlet face to select the desired interactive option provided by the controller. Selection may be effected in any suitable manner such as by programming the controller 32 to visually highlight any of the displayed options as the cursor is simply placed thereover.

Alternatively, the pointer 36 itself may be configured with one or more buttons thereon which may be pressed to change the modulation frequency of the emitted probe beam 33, which may be suitably detected by the light detectors and identified in the controller 32 as indicative of a selection being made by the user.

The particular advantage of the optical panel 12 disclosed above is its construction in any desired size from small to large by merely increasing the length of the individual waveguides and/or increasing the number thereof along the stacking height. The panel may be made relatively thin and provides enhanced contrast for projecting video images therethrough. The panel may be used without the optical coupler 26 with rear projection of the video image if desired. The advantage of using the optical coupler is the ability to mount the projector obliquely behind the optical panel for reducing the overall thickness of the entire display system.

In either configuration, the light detector arrays 38 need not extend over the full height of the panel, but are preferably configured in a shorter length for bridging only a portion of the waveguides along the panel height. The short linear arrays may then be used to define a correspondingly small virtual target on the outlet face inside which the probe spot 34 may be detected for providing interactive capability. In the preferred embodiment, the probe spot is generated by the remote pointer 36, but could be otherwise generated.

For example, the projector 28 may produce both visible and IR light, with at least a portion of the IR light being reflected back through the panel by simple finger touching of the outlet face. The screen may therefore be configured as a touchscreen with the inbound IR light spot 34 provided by a finger touch being detectable by the light detectors, and the cursor may be formed at the touch point (or at a location corresponding to that of the touch point), or eliminated if desired. The outlet face 18 may be covered, for example, with a finger, palm (or other body part), pencil eraser, stylus (i.e. preferably of blunt type), or paper (e.g. for bar-code reading purposes) for reflecting inbound at least a portion of the outbound projector light, the covering element either directly touching the outlet face 18 or providing a reflective surface spaced closely near the outlet face 18.

The detected location of the probe spot 34 in the virtual target may then be used for displaying the cursor 40 at any other desired location on the outlet face with any desired correspondence or mapping between the cursor location and the controlling spot location.

The outbound image beam and the inbound/returning probe beam are both transmitted within the same waveguide. Alternatively, in any of the embodiments above, alternating ones of the waveguides may be dedicated for transmitting the outbound image beam and the (reflected) inbound probe beam. The optical detector may then be used for observing the dedicated inbound waveguides for detecting any inbound/returning probe light.

In the exemplary display system application illustrated in FIG. 4, the virtual target 42 is preferably defined in the center of the optical panel both vertically and horizontally, and is effectively indistinguishable from the full surface area of the entire outlet face to the user aiming the pointer 36. Relatively small movement of the pointer 36 within the target 42 is transformed to a correspondingly larger movement of the cursor 40 within the entire outlet face.

In an alternate embodiment, the target may be located toward or in any one of the four corners of the outlet face and may be activated by the pointer 36 and/or simple touching of the target. In this way, any light input into the target may be effectively transformed in position and also enlarged, if desired, over the entire outlet face, excluding the target zone if desired. This form of operation may be useful in typical audio-visual presentations in conference rooms when the speaker can only reach a lower corner of the screen, but still wishes to interact with any portion of the entire outlet face.

Furthermore, it is also possible to project secondary video images into the target zone and have those images enlarged over the entire outlet face for any purpose, such as in video presentations. By rastering the light spot over the surface area of the target, a corresponding rastered secondary video image may be superimposed over the primary video image effected by the controller.

Accordingly, the display system described above provides enhanced interactive capability with the simple introduction of the linear array light detectors operatively coupled to the controller. The controller may be configured in any suitable software to provide the desired interactive capabilities based on the detection of the inbound light in the target to control the projected video image on the outlet face.

Since the detector arrays may be relatively short compared to the overall height of the optical panel, the cost associated therewith is relatively less. And, therefore, interactive capability may be introduced into the display system with few additional components and with correspondingly little additional cost.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A display system, comprising:
   an optical panel including a plurality of optical waveguides stacked together, with first ends thereof defining an inlet face, and opposite ends thereof defining an outlet face;
   a projector for projecting an image beam outbound across said inlet face for display on said outlet face;
   an imaging device for imaging said image beam is optically aligned between said projector and said inlet face; and
   at least one optical detector bridging only some of said waveguides for detecting a location of an inbound light spot on said outlet face;
   a controller operatively coupled to said imaging device and said at least one detector, wherein said controller is configured for controlling said imaging device to display a visible indicator on said outlet face at a location corresponding to said detected spot location;
   wherein said at least one detector bridges said only some of said waveguides to define a virtual target only on a portion of said outlet face, and wherein said detected spot location is located solely within said target.

2. A display system according to claim 1 wherein said controller is further configured for controlling said imaging device to display said indicator at a location on said outlet face that is offset in relation to said detected spot location.

3. A display system according to claim 1 wherein said controller is further configured for controlling said imaging device to display said indicator at a location on said outlet face that is outside said target in response to said detected spot location.

4. A display system according to claim 1 wherein said target is smaller in area than said outlet face, and wherein said controller is further configured to position said indicator on said outlet face at a location correspondingly spread out from said detected spot location.

5. A display system according to claim 1 wherein said target is scaled smaller than said outlet face, and wherein said controller is further configured to position said indicator on said outlet face at a location correspondingly scaled larger from said detected spot location.

6. A display system according to claim 1 wherein said controller is further configured for controlling said imaging device to additionally display a menu on said outlet face and position said indicator on said menu in response to movement of said spot within said target.

7. A display system according to claim 1 further comprising a remote pointer configured for emitting a light beam toward said outlet face for placement within said target as said spot.

8. A display system according to claim 7 wherein said light beam emitted from said remote pointer comprises infrared light.

9. A display system according to claim 1 wherein said outlet face is substantially parallel to said inlet face.

10. A display system according to claim 1 wherein said indicator is in the form of a visible cursor.

11. A display system according to claim 1 further comprising a plurality of said light spots forming an auxiliary image located within said target, and wherein an enlarged image corresponding to said auxiliary image is displayed on said outlet face in an area which is larger than that of said target.

12. A display system according to claim 1 wherein each of said waveguides extends horizontally across the width of said panel, and said waveguides being stacked together vertically along the height of said panel, and wherein said at least one detector bridges said only some of said waveguides along said panel height to define on said outlet face said target.

13. A display system according to claim 1 wherein said at least one detector bridges said panel along one edge of said panel.

14. A display system according to claim 1 wherein said at least one detector includes a pair of said detectors, wherein said pair of said detectors bridges said panel along opposite edges of said panel.

15. A display system according to claim 1 wherein said at least one detector bridges only a mid portion of said panel along one edge of said panel, and wherein said mid portion of said panel is inward of a top and bottom portion of said panel.

16. A display system according to claim 1 wherein said at least one detector includes a pair of said detectors, wherein said pair of said detectors bridges only a mid portion of said panel along opposite edges of said panel, and wherein said mid portion of said panel is inward of a top and bottom portion of said panel.

17. A display system according to claim 16 further comprising a comparator operatively coupled to said pair of detectors for comparing a relative intensity of said spot to determine a lateral position thereof within said target.

18. A display system according to claim 17 wherein said detectors comprise linear photodiode arrays extending across said waveguides for determining a transverse position of said spot within said target, said transverse position of said spot corresponding with a position of the photodiodes in said photodiode arrays.

19. A display system according to claim 1 wherein said waveguides are in the form of ribbons.

20. A display system according to claim 1 wherein said inbound light spot is formed by covering a spot on said outlet face with at least one covering element selected from the group consisting of finger, palm, pencil eraser, stylus, and paper.

21. A display system according to claim 20 wherein said covering element reflects at least a portion of said image beam inbound through at least one waveguide to thereby provide said inbound light spot.

22. A display system according to claim 20 wherein said covering element reflects at least a portion of said image beam into an adjoining waveguide to thereby provide said inbound light spot.

23. A display system according to claim 20 wherein said covering element is in contact with said outlet face.

24. A display system according to claim 20 wherein said covering element is spaced from said outlet face.

25. A method of providing interaction in a display system including an optical panel having a plurality of optical waveguides stacked together, with first ends thereof defining an inlet face, and opposite ends thereof defining an outlet face, said method comprising:
projecting an image beam outbound across said inlet face for display on said outlet face;
imaging said projected image beam;
detecting a location on said outlet face of an inbound light spot, wherein said detected spot location is located on said outlet face solely within a virtual target, and wherein said target is only on a portion of said outlet face; and
displaying a visible indicator on said outlet face at a location corresponding to said detected spot location;
wherein said indicator is displayed at a location on said outlet face that is offset in relation to said detected spot location.

26. A method according to claim 25 further comprising:
displaying a menu on said outlet face; and
positioning said indicator on said menu in response to movement of said spot within said target.

27. A method according to claim 25 further comprising emitting a light beam toward said outlet face for placement within said target as said spot.

28. A method according to claim 27 wherein said emitted light beam comprises infrared light.

29. A method according to claim 25 wherein said outlet face is substantially parallel to said inlet face.

30. A method according to claim 25 wherein said indicator is in the form of a visible cursor.

31. A method according to claim 25 wherein each of said waveguides extends horizontally across the width of said panel, and said waveguides being stacked together vertically along the height of said panel.

32. A method according to claim 25 wherein said target is positioned only at a mid portion of said panel, and wherein said mid portion of said panel is inward of a top and bottom portion of said panel.

33. A method according to claim 25 further comprising comparing a relative intensity of said spot to determine a lateral position thereof within said target.

34. A method according to claim 33 further comprising determining a transverse position of said spot within said target.

35. A method according to claim 25 wherein said waveguides are in the form of ribbons.

36. A method according to claim 25 further comprising reflecting at least a portion of said outbound image beam at said outlet face to form said inbound light spot.

37. A method according to claim 36 wherein said reflecting occurs by covering a spot on said outlet face with at least one covering element selected from the group consisting of finger, palm, pencil eraser, stylus, and paper.

38. A method according to claim 37 wherein said covering element reflects said at least a portion of said image beam into an adjoining waveguide to thereby provide said inbound light spot.

39. A method according to claim 37 wherein said covering element is in contact with said outlet face.

40. A method according to claim 37 wherein said covering element is spaced from said outlet face.

41. A method of providing interaction in a display system including an optical panel having a plurality of optical waveguides stacked together, with first ends thereof defining an inlet face, and opposite ends thereof defining an outlet face, said method comprising:
projecting an image beam outbound across said inlet face for display on said outlet face;
imaging said projected image beam;
detecting a location on said outlet face of an inbound light spot, wherein said detected spot location is located on said outlet face solely within a virtual target, and wherein said target is only on a portion of said outlet face; and
displaying a visible indicator on said outlet face at a location corresponding to said detected spot location;
wherein said indicator is displayed at a location on said outlet face that is outside said target in response to said detected spot location.

42. A method of providing interaction in a display system including an optical panel having a plurality of optical waveguides stacked together, with first ends thereof defining an inlet face, and opposite ends thereof defining an outlet face, said method comprising:
projecting an image beam outbound across said inlet face for display on said outlet face;
imaging said projected image beam;
detecting a location on said outlet face of an inbound light spot, wherein said detected spot location is located on said outlet face solely within a virtual target, and wherein said target is only on a portion of said outlet face; and
displaying a visible indicator on said outlet face at a location corresponding to said detected spot location;
wherein said target is smaller in area than said outlet face, and wherein said indicator is positioned on said outlet face at a location correspondingly spread out from said detected spot location.

43. A method of providing interaction in a display system including an optical panel having a plurality of optical waveguides stacked together, with first ends thereof defining an inlet face, and opposite ends thereof defining an outlet face, said method comprising:
projecting an image beam outbound across said inlet face for display on said outlet face;
imaging said projected image beam;
detecting a location on said outlet face of an inbound light spot, wherein said detected spot location is located on said outlet face solely within a virtual target, and wherein said target is only on a portion of said outlet face; and displaying a visible indicator on said outlet face at a location corresponding to said detected spot location; wherein said target is scaled smaller than said outlet face, and wherein said indicator is positioned on said outlet face at a location correspondingly scaled larger from said detected spot location.

44. A method of providing interaction in a display system including an optical panel having a plurality of optical waveguides stacked together, with first ends thereof defining an inlet face, and opposite ends thereof defining an outlet face, said method comprising:

projecting an image beam outbound across said inlet face for display on said outlet face;

imaging said projected image beam;

detecting a location on said outlet face of an inbound light spot, wherein said detected spot location is located on said outlet face solely within a virtual target, and wherein said target is only on a portion of said outlet face;

displaying a visible indicator on said outlet face at a location corresponding to said detected spot location;

forming an auxiliary image located within said target; and displaying an enlarged image corresponding to said auxiliary image on said outlet face in an area which is larger than that of said target.

* * * * *